(12) United States Patent
Kanno (10) Patent No.: US 8,703,349 B2
(45) Date of Patent: Apr. 22, 2014

(54) FUEL CELL SYSTEM

(75) Inventor: Yoshihito Kanno, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 732 days.

(21) Appl. No.: 12/521,169

(22) PCT Filed: Feb. 5, 2008

(86) PCT No.: PCT/JP2008/051803
§ 371 (c)(1),
(2), (4) Date: Jun. 25, 2009

(87) PCT Pub. No.: WO2008/099710
PCT Pub. Date: Aug. 21, 2008

(65) Prior Publication Data
US 2010/0021782 A1 Jan. 28, 2010

(30) Foreign Application Priority Data
Feb. 5, 2007 (JP) .................... 2007-025904

(51) Int. Cl.
*H01M 8/04* (2006.01)
*H01M 8/22* (2006.01)
(52) U.S. Cl.
USPC ............... 429/444; 429/431; 429/502
(58) Field of Classification Search
USPC ......... 429/446, 430, 513, 415, 444, 442, 410, 429/429, 428, 431, 502
See application file for complete search history.

(56) References Cited

U.S. PATENT DOCUMENTS

| | | | |
|---|---|---|---|
| 3,823,038 A * | 7/1974 | Baker et al. | 429/410 |
| 5,503,944 A * | 4/1996 | Meyer et al. | 429/437 |
| 6,423,434 B1 * | 7/2002 | Pratt et al. | 429/431 |
| 6,558,827 B1 | 5/2003 | Reiser | |
| 7,718,286 B2 | 5/2010 | Fujita | |
| 2001/0049035 A1 | 12/2001 | Haltiner, Jr. et al. | |
| 2003/0022043 A1 * | 1/2003 | McElroy | 429/23 |
| 2003/0157383 A1 | 8/2003 | Takahashi | |

(Continued)

FOREIGN PATENT DOCUMENTS

JP 9-266004 10/1997
JP 9-312167 12/1997

(Continued)

OTHER PUBLICATIONS

German Office Action for German Patent Appl. No. 11 2008 000 528.1-45 dated Oct. 20, 2010.

(Continued)

*Primary Examiner* — Kenneth Douyette
(74) *Attorney, Agent, or Firm* — Finnegan, Henderson, Farabow, Garrett & Dunner, LLP (57) ABSTRACT

A fuel cell system includes a fuel cell, an exhaust mechanism that is connected to a downstream end of an anode gas flow channel and is capable of selecting an exhaust mode and a closed mode, a detecting device for detecting a downstream flow of an impurity in the anode gas flow channel, and a controlling device for controlling the operation of the exhaust mechanism such that the exhaust mode is selected when the magnitude of the downstream flow of the impurity meets a predetermined switching criterion and the closed mode is selected when the magnitude of the downstream flow of the impurity does not meet the switching criterion.

6 Claims, 2 Drawing Sheets

(56) References Cited

U.S. PATENT DOCUMENTS

| | | |
|---|---|---|
| 2004/0033401 A1* | 2/2004 | Mardilovich et al. ............ 429/26 |
| 2004/0096721 A1 | 5/2004 | Ohlsen et al. |
| 2005/0214617 A1 | 9/2005 | Chapman et al. |
| 2005/0244686 A1* | 11/2005 | Kamihara ........................ 429/22 |
| 2006/0240309 A1 | 10/2006 | Dehne |
| 2007/0009772 A1 | 1/2007 | Iio |
| 2008/0008921 A1* | 1/2008 | Miura ............................. 429/34 |
| 2008/0166611 A1* | 7/2008 | Yoshida .......................... 429/25 |

FOREIGN PATENT DOCUMENTS

| | | | |
|---|---|---|---|
| JP | 2004-185974 | 7/2004 | |
| JP | 2005-141977 | 6/2005 | |
| JP | 2005/203143 A1 * | 7/2005 | ............. H01M 8/04 |
| JP | 2005-243477 | 9/2005 | |
| JP | 2005-327597 | 11/2005 | |
| JP | 2005-353303 | 12/2005 | |
| JP | 2005-353569 | 12/2005 | |
| JP | 2006-19124 | 1/2006 | |
| JP | 2006-294295 | 10/2006 | |
| JP | 2007-242266 | 9/2007 | |
| WO | WO 2005/041333 | 5/2005 | |

OTHER PUBLICATIONS

English Translation of the International Preliminary Report on Patentability, mailed Aug. 20, 2009, for PCT/JP2008/051803.

* cited by examiner

Fig. 6

FUEL CELL SYSTEM

CROSS-REFERENCE TO RELATED APPLICATIONS

This application is a national phase application of International Application No. PCT/JP2008/051803, filed Feb. 5, 2008, and claims the priority of Japanese Application No. 2007-025904, filed Feb. 5, 2007, the contents of both of which are incorporated herein by reference.

TECHNICAL FIELD

The present invention relates to a fuel cell system having a fuel cell that generates an electric power using a fuel gas supplied to an anode thereof and air supplied to a cathode thereof.

BACKGROUND ART

As disclosed in the patent documents listed below, there are known fuel cell systems that confine the fuel gas in a gas flow channel that is in contact with the anode in the power generating surface of the fuel cell (referred to as anode gas flow channel hereinafter) during operation (referred to as anode dead end system hereinafter). In the anode dead end system, impurities, such as nitrogen and water, are accumulated in the anode gas flow channel of the fuel cell during operation. If the impurities cover the surface of the membrane electrode assembly (MEA), the electromotive reaction on the electrode catalyst is inhibited, resulting in a decrease in voltage. In addition, the resulting abnormal potential can cause deterioration of the MEA. Thus, the conventional anode dead end systems open the exhaust valve at appropriate times to discharge the impurities accumulated in the anode gas flow channel to the outside of the system at the downstream end of the anode gas flow channel.

Patent document 1: JP-A-2005-353569
Patent document 2: JP-A-2005-353303
Patent document 3: JP-A-2005-243477
Patent document 4: JP-A-H9-312167

DISCLOSURE OF THE INVENTION

For the conventional anode dead end systems, when the exhaust valve is opened, not only the impurities but also the fuel gas in the anode gas flow channel are discharged. Therefore, frequent opening of the exhaust valve undesirably leads to poor fuel economy. If the exhaust valve is opened when an adequate amount of impurities is accumulated at the downstream end of the anode gas flow channel, the amount of fuel gas wastefully discharged can be reduced accordingly. Therefore, in terms of fuel economy, it is preferred that the frequency of opening of the exhaust valve is minimized.

On the other hand, in terms of maintaining adequate performance of the fuel cell, it is not preferred that accumulation of the impurities is concentrated at the downstream end of the anode gas flow channel. This is because the impurities cause a decrease in output voltage and deterioration of the MEA. That is, for the conventional anode dead end systems, prevention of degradation of the performance of the fuel cell due to accumulation of impurities and improvement of fuel economy by reducing the amount of discharged fuel gas are contradictory requirements, and it is difficult to meet the two requirements at the same time.

The present invention has been devised to solve the problems described above. An object of the present invention is to provide a fuel cell system that can achieve both prevention of degradation of the performance of a fuel cell due to accumulation of an impurity in an anode gas flow channel and reduction of the amount of discharged fuel gas to the outside of the system.

Means for Solving the Problem

The above object is achieved by a first aspect of the present invention. The first aspect of the present invention is a fuel cell system, including:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the consumption of the fuel cell in the anode gas flow channel is discharged to the outside of the system and a closed mode in which communication between the anode gas flow channel and the outside of the system is blocked;

detecting means for detecting a downstream flow of an impurity in the anode gas flow channel; and controlling means for controlling the operation of the exhaust mechanism that selects the exhaust mode when the magnitude of the downstream flow of the impurity meets a predetermined switching criterion and selects the closed mode when the magnitude of the downstream flow of the impurity does not meet the switching criterion.

A second aspect of the present invention is the fuel cell system according to the first aspect, wherein the detecting means detects the flow of the impurity based on the magnitude of a load on the fuel cell.

A Third aspect of the present invention is the fuel cell system according to the first aspect, wherein the detecting means detects the flow of the impurity based on a physical quantity relating to the flow rate of the fuel gas in the anode gas flow channel and a physical quantity relating to the diffusion rate of the impurity in the anode gas flow channel.

The above object is also achieved by a fourth aspect of the present invention. The fourth aspect of the present invention is a fuel cell system, including:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the consumption of the fuel cell in the anode gas flow channel is discharged to the outside of the system and a closed mode in which communication between the anode gas flow channel and the outside of the system is blocked;

determining means for determining the loading state of the fuel cell; and controlling means for controlling the operation of the exhaust mechanism that selects the exhaust mode when the fuel cell operates in a predetermined high load region and selects the closed mode when the fuel cell operates in a lower load region than the predetermined load region.

A fifth aspect of the present invention is the fuel cell system according to the fourth aspect, wherein the controlling means sets the predetermined load region based on the gas temperature in the anode gas flow channel.

A sixth aspect of the present invention is the fuel cell system according to the fourth or the fifth aspect, wherein the controlling means sets the predetermined load region based on the gas pressure in the anode gas flow channel.

The above object is also achieved by a seventh aspect of the present invention. The seventh aspect of the present invention is a fuel cell system, including:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the consumption of the fuel cell in the anode gas flow channel is discharged to the outside of the system and a closed mode in which communication between the anode gas flow channel and the outside of the system is blocked;

first measuring means for measuring a physical quantity relating to the flow rate of the fuel gas in the anode gas flow channel;

second measuring means for measuring a physical quantity relating to the diffusion rate of an impurity in the anode gas flow channel; and controlling means for controlling the operation of the exhaust mechanism that performs switching between the exhaust mode and the closed mode based on comparison between a reference value calculated from a measurement value of the second measuring means and a comparison target value calculated from a measurement value of the first measuring means.

A eighth aspect of the present invention is the fuel cell system according to the seventh aspect, wherein the first measuring means measures the current value of the fuel cell and the gas pressure in the anode gas flow channel.

A ninth aspect of the present invention is the fuel cell system according to the seventh or eighth aspect, wherein the second measuring means measures the temperature of the fuel cell.

A tenth aspect of the present invention is the fuel cell system according to the seventh or eighth aspect, wherein the second measuring means measures the gas temperature in the anode gas flow channel.

A eleventh aspect of the present invention is the fuel cell system according to any one of the seventh to the tenth aspects, wherein the second measuring means measures the gas pressure in the anode gas flow channel.

Advantages of the Invention

According to the first aspect of the present invention, since a substantially smaller amount of gas than the consumption of the fuel gas in the anode gas flow channel is discharged to the outside of the system, the impurity accumulated at the downstream end of the anode gas flow channel can be discharged to the outside of the system in small amounts while reducing the amount of fuel gas wastefully discharged, and therefore, accumulation of the impurity that can cause degradation of the performance of the fuel cell can be prevented. In addition, whether or not the impurity can be accumulated at the downstream end of the anode gas flow channel is determined based on the magnitude of the downstream flow of the impurity, and communication between the anode gas flow channel and the outside of the system is blocked until the magnitude of the downstream flow of the impurity reaches a predetermined switching criterion. Therefore, wasteful discharge of the fuel gas can be prevented.

According to the second aspect of the present invention, the downstream flow of the impurity in the anode gas flow channel can be indirectly detected by measuring the magnitude of the load on the fuel cell. That is, a sensor dedicated to direct detection of the flow of the impurity is not needed.

According to the third aspect of the present invention, the downstream flow of the impurity in the anode gas flow channel can be indirectly detected by measuring the physical quantity relating to the flow rate of the fuel gas in the anode gas flow channel and the physical quantity relating to the diffusion rate of the impurity in the anode gas flow channel. That is, a sensor dedicated to direct detection of the flow of the impurity is not needed.

According to the fourth aspect of the present invention, since a substantially smaller amount of gas than the consumption of the fuel gas in the anode gas flow channel is discharged to the outside of the system, the impurity accumulated at the downstream end of the anode gas flow channel can be discharged to the outside of the system in small amounts while reducing the amount of fuel gas wastefully discharged, and therefore, accumulation of the impurity that can cause degradation of the performance of the fuel cell can be prevented. In addition, whether or not the impurity can be accumulated at the downstream end of the anode gas flow channel is determined based on the loading state of the fuel cell, and communication between the anode gas flow channel and the outside of the system is blocked when the fuel cell operates in a lower load region than the predetermined high load region in which the impurity can be accumulated. Therefore, wasteful discharge of the fuel gas can be prevented.

According to the fifth aspect of the present invention, since the predetermined load region for selecting the exhaust mode is set based on the gas temperature in the anode gas flow channel that relates to the diffusion rate of the impurity in the anode gas flow channel, discharge can be properly accomplished in the state where the impurity can be accumulated.

According to the sixth aspect of the present invention, since the predetermined load region for selecting the exhaust mode is set based on the gas pressure in the anode gas flow channel that relates to the diffusion rate of the impurity in the anode gas flow channel, discharge can be properly accomplished in the state where the impurity can be accumulated.

According to the seventh aspect of the present invention, when the exhaust mechanism operates in the exhaust mode to discharge a substantially smaller amount of gas than the consumption of the fuel gas in the anode gas flow channel to the outside of the system, the impurity accumulated at the downstream end of the anode gas flow channel can be discharged to the outside of the system in small amounts while reducing the amount of fuel gas wastefully discharged, and therefore, accumulation of the impurity that can cause degradation of the performance of the fuel cell can be prevented. When the exhaust mechanism operates in the closed mode to block communication between the anode gas flow channel and the outside of the system, wasteful discharge of the fuel gas in a condition where the impurity is not accumulated at the downstream end of the anode gas flow channel can be prevented. In addition, based on the comparison between the reference value calculated from the physical quantity relating to the diffusion rate of the impurity in the anode gas flow channel and the comparison target value calculated from the physical quantity relating to the flow rate of the fuel gas in the anode gas flow channel, it can be properly determined whether or not the impurity can be accumulated at the downstream end of the anode gas flow channel. Therefore, a high level of prevention of degradation of the performance of the fuel cell and a high level of reduction of the amount of discharged fuel gas can be both achieved by switching between the exhaust mode and the closed mode based on the result of the comparison.

According to the eighth aspect of the present invention, since the current value of the fuel cell and the gas pressure in the anode gas flow channel are measured, the flow rate of the fuel gas in the anode gas flow channel can be easily and accurately estimated. In addition, if the comparison target value described above is calculated based on the measurement values, it can be properly determined which of the exhaust mode and the closed mode is used.

According to the ninth aspect of the present invention, since the temperature of the fuel cell is measured, the diffusion rate of the impurity in the anode gas flow channel can be easily and accurately estimated. In addition, if the reference value described above is calculated based on the measurement value, it can be properly determined which of the exhaust mode and the closed mode is used.

According to the tenth aspect of the present invention, since the gas temperature in the anode gas flow channel is measured, the diffusion rate of the impurity in the anode gas flow channel can be easily and accurately estimated. In addition, if the reference value described above is calculated based on the measurement value, it can be properly determined which of the exhaust mode and the closed mode is used.

According to the eleventh aspect of the present invention, since the gas pressure in the anode gas flow channel is measured, the diffusion rate of the impurity in the anode gas flow channel can be easily and accurately estimated. In addition, if the reference value described above is calculated based on the measurement value, it can be properly determined which of the exhaust mode and the closed mode is used.

BEST MODE FOR CARRYING OUT THE INVENTION

In the following, an embodiment of the present invention will be described with reference to FIGS. 1 to 6.

Figure 1:
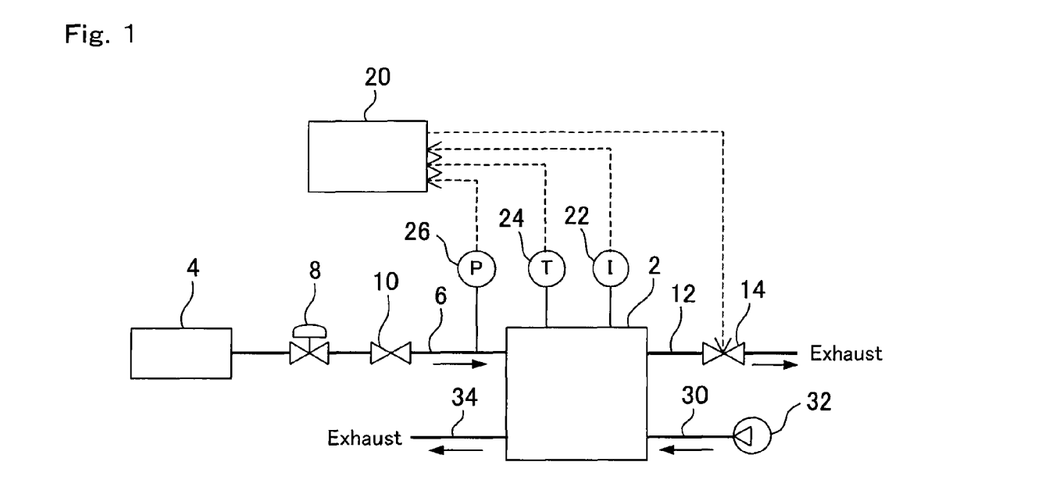
FIG. 1 is a schematic diagram showing a configuration of a fuel cell system according to an embodiment of the present invention.

FIG. 1 is a schematic diagram showing a configuration of a fuel cell system according to the present invention. The fuel cell system supplies an electric power generated by a fuel cell 2 to a load, such as a motor. In general, the fuel cell 2 has the form of a fuel cell stack composed of a plurality of cells stacked one on another. Although not shown, each cell has a pair of current collectors and a membrane electrode assembly interposed therebetween. The membrane electrode assembly includes a solid polymer electrolyte membrane, catalyst portions formed on the both surfaces of the solid polymer electrolyte membrane, and gas diffusion layers, such as a carbon sheet, formed on the surfaces of the catalyst portions. Each current collector serves also as a separator between adjacent two membrane electrode assemblies. Each cell generates electric power using hydrogen as a fuel gas supplied to the anode thereof and air supplied to the cathode thereof.

A hydrogen supply pipe 6 for supplying hydrogen from a high pressure hydrogen tank 4 to the fuel cell stack 2 is connected to the fuel cell stack 2. As seen from the upstream side, the hydrogen supply pipe 6 includes a hydrogen pressure regulating valve 8 and then a hydrogen inlet valve 10. Hydrogen is supplied to the fuel cell stack 2 after the pressure is reduced to a desired pressure by the pressure regulating valve 8. The hydrogen supplied to the fuel cell stack 2 is distributed to the anodes of the cells through a supply manifold (not shown) in the fuel cell stack 2.

The fuel cell system according to this embodiment has an exhaust pipe 12 for discharging an anode gas from the fuel cell stack 2. The exhaust pipe 12 is connected to the downstream end of an anode gas flow channel (a gas flow channel in contact with the anode formed in the power generating surface) of each cell via an exhaust manifold (not shown) in the fuel cell stack 2. Gas in the anode gas flow channel (anode gas) is collected in the exhaust manifold and discharged to the exhaust pipe 12. The tip end of the exhaust pipe 12 opens into the atmosphere or is connected to a diluter.

The exhaust pipe 12 has a duty-controllable electromagnetic exhaust valve 14 as an exhaust mechanism that changes the state of communication of the exhaust pipe 12. The exhaust valve 14 is preferably of the injector type, which is superior in flow rate controllability. The exhaust valve 14 can selectively operate in a closed mode in which the exhaust valve 14 is completely closed (that is, the duty ratio is zero) or in an exhaust mode in which the exhaust valve 14 is controlled to open at a predetermined duty ratio. When the closed mode is selected, the communication of the anode gas flow channel of the fuel cell stack 2 to the outside of the system is blocked. On the other hand, when the exhaust mode is selected, the anode gas flow channel communicates with the outside of the system, and the anode gas can be discharged to the outside of the system. However, the duty ratio in the exhaust mode is low, and the flow rate of the anode gas discharged to the outside of the system is regulated to an extremely small value compared with the consumption of hydrogen in the anode gas flow channel. In the following, the operation of the fuel cell system in the closed mode will be referred to as anode dead end operation, and the operation of the fuel cell system in the exhaust mode will be referred to as continuous small amount discharge operation. In addition to the closed mode and the exhaust mode, other operation modes, such as a full open mode in which the exhaust valve 14 is fully opened, can be used as required. However, the present invention can be implemented as far as selection from at least the closed mode and the exhaust mode can be made.

The fuel cell stack 2 is connected to an air supply pipe 30 for supplying air. The air supply pipe 30 includes an air pump 32. Air is sucked by the air pump 32 into the air supply pipe 30 and supplied to the fuel cell stack 2. The air supplied to the fuel cell stack 2 is distributed to the cathodes of the cells through a supply manifold in the fuel cell stack 2. The air passing through the cathodes of the cells is collected in an exhaust manifold in the fuel cell stack 2 and discharged to an exhaust pipe 34.

Figure 2:
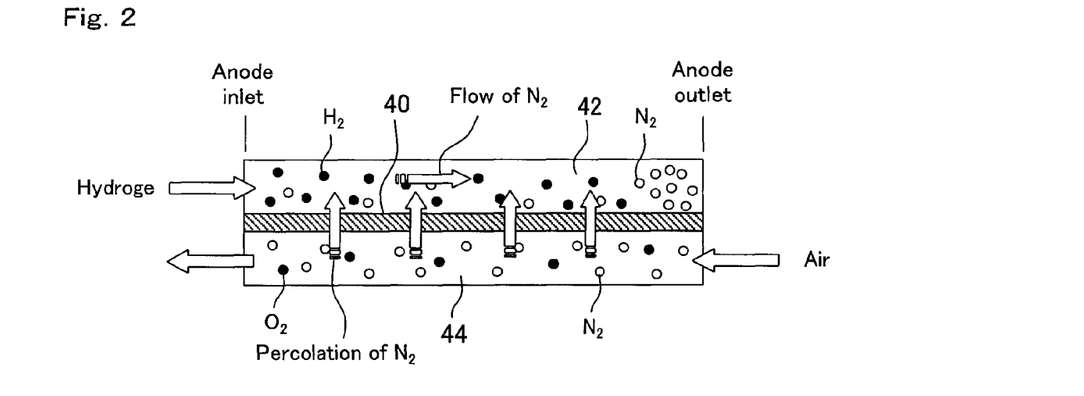
FIG. 2 is a schematic diagram showing an internal structure of a cell of the fuel cell stack and a phenomenon occurring in the cell.

FIG. 2 is a schematic diagram showing an internal structure of a cell of the fuel cell stack 2 and a phenomenon occurring in the cell. FIG. 2 shows only parts involved with the characteristics of the present invention and does not show other parts that are not involved with the characteristics of the present invention, such as the current collectors and the manifolds. In the following, description will be made with reference to both FIG. 1 and FIG. 2.

As shown in FIG. 2, the cell has gas flow channels 42 and 44 formed along the opposite surfaces of a membrane electrode assembly 40. Hydrogen is supplied to the gas flow channel 42 for the anode of the membrane electrode assembly 40. Air is supplied to the gas flow channel 44 for the cathode of the membrane electrode assembly 40. It is to be noted that the shape and structure of the gas flow channels 42 and 44 are not particularly restricted. For example, grooves can be formed in the surfaces of each current collector (separator), and the grooves can be used as the gas flow channels 42 and 44. Alternatively, a porous layer made of a conductive material can be formed between each current collector and the adjacent membrane electrode assembly 40, and the adjacent pores in the porous layers can be used as the gas flow channels 42 and 44.

The air supplied to the cathode gas flow channel 44 contains not only oxygen ($O_2$) used for electric power generation but also nitrogen ($N_2$). Nitrogen is an inert gas and does not contribute to electric power generation, so that the nitrogen is discharged to the outside of the system through the cathode gas flow channel 44. However, part of the nitrogen passes through the membrane electrode assembly 40 as schematically shown by the arrows in FIG. 2 and enters the anode gas flow channel 42. The cause of the movement of nitrogen into the anode gas flow channel 42 is the difference in nitrogen partial pressure between the cathode gas flow channel 44 and the anode gas flow channel 42. The nitrogen ($N_2$) having passed through the membrane electrode assembly 40 flows to the downstream of the anode gas flow channel 42 with the hydrogen ($H_2$) flowing in the anode gas flow channel 42 as schematically shown by the arrows in FIG. 2.

Air contains not only nitrogen but also other impurities that don't contribute to electric power generation, such as water vapor and carbon dioxide. However, the concentration of those impurities in the air is substantially lower than the concentration of nitrogen. Thus, nitrogen is exclusively described as the impurity in this specification. However, it does not mean that other substances than nitrogen are not supposed to be impurities in the present invention.

As described above, the fuel cell system according to this embodiment is capable of the anode dead end operation in which the exhaust valve 14 is set in the closed mode. In the anode dead end operation, hydrogen supplied to the fuel cell stack 2 can be efficiently used. However, in this case, nitrogen, which is an impurity in the anode gas, is gradually accumulated at the downstream end of the anode gas flow channel 42 as schematically shown in FIG. 2. If the nitrogen covers the surface of the membrane electrode assembly 40, the electromotive reaction on the catalyst is inhibited, and the membrane electrode assembly 40 is deteriorated due to a decrease in voltage or occurrence of an abnormal potential.

In this regard, the fuel cell system according to this embodiment can carry out the continuous small amount discharge operation in which the exhaust valve 14 is set in the exhaust mode, thereby preventing accumulation of nitrogen at the downstream end of the anode gas flow channel 42. That is, the nitrogen accumulated at the downstream end of the anode gas flow channel 42 can be discharged to the outside of the system in small amounts by discharging a substantially smaller amount of gas than the consumption of hydrogen in the anode gas flow channel 42 to the outside of the system. Therefore, accumulation of nitrogen that leads to degradation of the performance of the fuel cell stack can be prevented while reducing the amount of hydrogen wastefully discharged.

Figure 3:
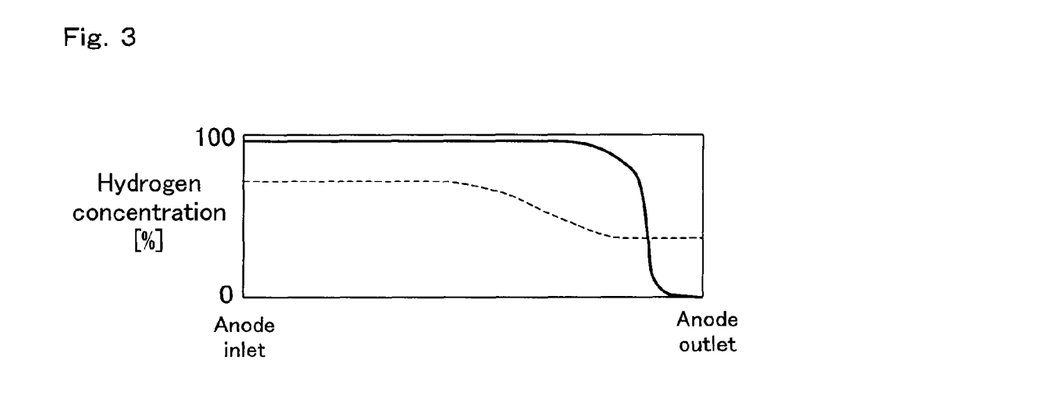
FIG. 3 is a graph showing the hydrogen concentration distribution in a anode gas flow channel.

FIG. 3 is a graph showing the hydrogen concentration distribution in the anode gas flow channel 42 in the anode dead end operation. The nitrogen concentration is determined by subtracting the hydrogen concentration from 100%. The solid line in FIG. 3 indicates a hydrogen concentration distribution in a case where nitrogen is accumulated at the downstream end of the anode gas flow channel 42. The continuous small amount discharge operation is effective in such a case where nitrogen can be accumulated at the downstream end of the anode gas flow channel 42.

On the other hand, in a case of the hydrogen concentration distribution indicated by the dashed line in FIG. 3, or in other words, in a case where nitrogen is dispersed in the anode gas flow channel 42, hydrogen is wastefully discharged if the continuous small amount discharge operation is carried out. This is because nitrogen is not accumulated at the downstream end of the anode gas flow channel 42. In such a case, the anode dead end operation is preferably used. The decision as to which of the anode dead end operation and the continuous small amount discharge operation is used has to be made based on whether nitrogen can be accumulated at the downstream end of the anode gas flow channel 42 or not.

Whether nitrogen is accumulated at the downstream end of the anode gas flow channel 42 or not depends on the flow of nitrogen in the anode gas flow channel 42. As schematically shown by the arrows in FIG. 2, when nitrogen flows downstream in the anode gas flow channel 42, nitrogen is inevitably accumulated at the downstream end. Therefore, it can be contemplated that, if the downstream flow of nitrogen in the anode gas flow channel 42 can be detected, switching between the anode dead end operation and the continuous small amount discharge operation can be properly performed.

The fuel cell system according to this embodiment indirectly detects the downstream flow of nitrogen in the anode gas flow channel 42 in the manner described below. The magnitude of the flow of nitrogen in the anode gas flow channel 42 is determined by the diffusion rate of nitrogen in the anode gas flow channel 42 and the flow rate of hydrogen in the anode gas flow channel 42. If the flow rate of hydrogen is higher than the diffusion rate of nitrogen, the nitrogen having passed through the membrane electrode assembly 40 is not diffused upstream in the anode gas flow channel 42 but flowed downstream. As a result, the hydrogen concentration distribution shown by the solid line in FIG. 3 occurs. The higher the flow rate of hydrogen, the greater the downstream flow of nitrogen is. On the other hand, if the flow rate of hydrogen is lower than the diffusion rate of nitrogen, the nitrogen is diffused upstream in the anode gas flow channel 42, and the hydrogen concentration distribution shown by the dashed line in FIG. 3 occurs.

The fuel cell system according to this embodiment does not directly measure the flow rate of hydrogen in the anode gas flow channel 42 but measures the value of the output current of the fuel cell stack 2 and the gas pressure in the anode gas flow channel 42 as physical quantities relating to the flow rate of hydrogen. The flow rate of hydrogen flowing into the anode gas flow channel 42 can be expressed as a function of the output current of the fuel cell stack 2 and the gas pressure in the anode gas flow channel 42 if the anode gas flow channel 42 has a uniform cross-sectional shape. The current value of the fuel cell stack 2 is measured by an ammeter 22 attached to the fuel cell stack 2. The gas pressure in the anode gas flow channel 42 is measured by a pressure sensor 26 attached to the hydrogen supply pipe 6 at the inlet of the fuel cell stack 2.

Furthermore, the fuel cell system according to this embodiment does not directly measure the diffusion rate of nitrogen in the anode gas flow channel 42 but measures the gas pressure and the gas temperature in the anode gas flow channel 42 as physical quantities relating to the diffusion rate of nitrogen. The diffusion rate of nitrogen can be expressed as a function of the gas temperature and the gas pressure in the anode gas flow channel 42. The gas temperature in the anode gas flow channel 42 is substantially equal to the temperature of the whole of the fuel cell stack 2 and therefore can be indirectly measured by a temperature sensor 24 attached to the fuel cell stack 2. Of course, the gas temperature in the anode gas flow channel 42 can also be directly measured.

In the fuel cell system according to this embodiment, the operation of the exhaust valve 14 is controlled by a controller 20. Measurement signals of the ammeter 22, the pressure sensor 26 and the temperature sensor 24 are input to the controller 20. The controller 20 calculates a reference value from the measurement values from the pressure sensor 26 and the temperature sensor 24 and a comparison target value (of the same dimension as the reference value) to be compared with the reference value from the measurement values from the ammeter 22 and the pressure sensor 26. The controller 20 properly determines whether nitrogen can be accumulated at the downstream end of the anode gas flow channel 42 or not based on the comparison between the reference value and the comparison target value and switches the operation mode of the exhaust valve 14 based on the result of the determination. In the following, a routine for controlling the exhaust valve 14 carried out by the controller 20 will be described with reference to the flowchart of FIG. 4.

Figure 4:
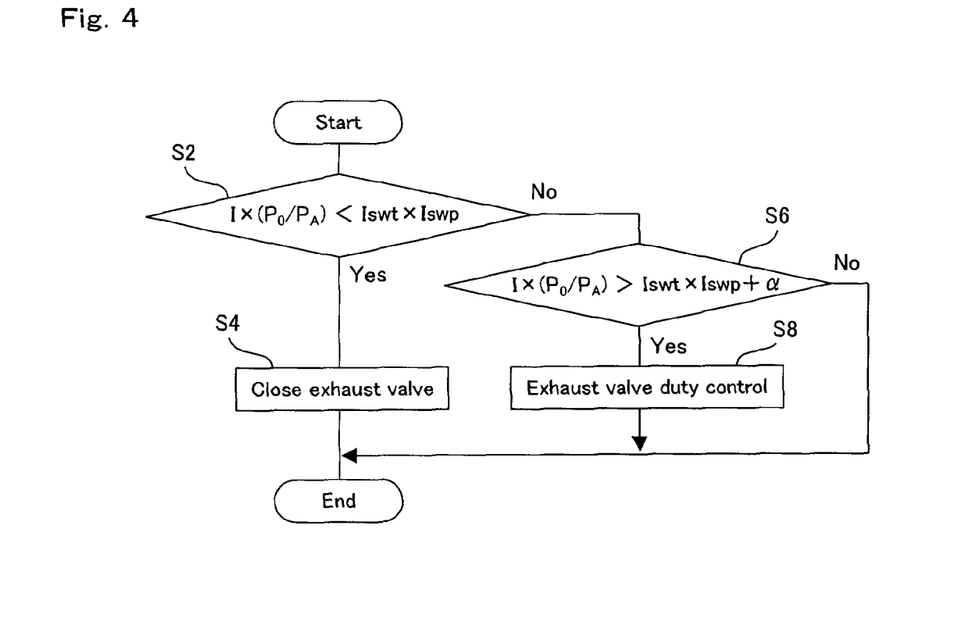
FIG. 4 is a flowchart illustrating a routine that is executed by the embodiment of the present invention to control an exhaust valve.

In the routine shown in FIG. 4, first, in step S2, it is determined whether to switch from the exhaust mode to the closed mode. In this switching determination, it is determined whether the condition shown by the following formula (1) is satisfied or not. The left-hand side of the formula (1) represents the comparison target value, and the right-hand side represents the reference value.

$$I^*(P_O/P_A) < I_{swt} * I_{swp} \quad (1)$$

In the formula (1), the character I used for calculation of the comparison target value represents the value of the current measured by the ammeter 22. The characters $P_O$ and $P_A$ represent the standard atmospheric pressure and the gas pressure in the anode gas flow channel measured by the pressure sensor 26, respectively.

Figure 5:
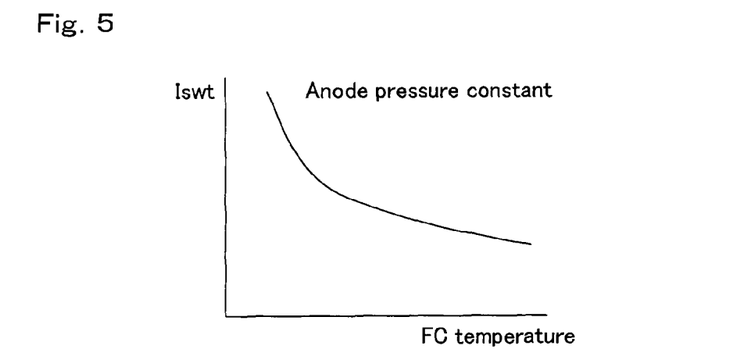
FIG. 5 is a graph showing a relationship between the temperature of the fuel cell and a variable $I_{swt}$ used for a switching determination of operation mode of the exhaust valve.
Figure 6:
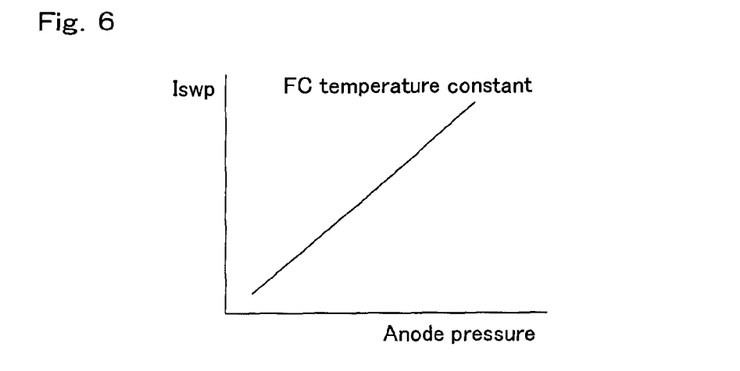
FIG. 6 is a graph showing a relationship between the gas pressure in an anode gas flow channel and a variable $I_{swp}$ used for a switching determination of operation mode of the exhaust valve.

In the formula (1), the character $I_{swt}$ used for calculation of the reference value represents a variable that is determined from the temperature of the fuel cell stack 2 measured by the temperature sensor 24. The variable is determined using a previously prepared map. FIG. 5 is a graph showing a relationship between the temperature of the fuel cell stack 2 (FC temperature) and the variable $I_{swt}$ defined by the map. The character $I_{swp}$ represents a variable that is determined from the gas pressure measured by the pressure sensor 26. The variable is determined using a previously prepared map. FIG. 6 is a graph showing a relationship between the gas pressure in the anode gas flow channel 42 (anode pressure) and the variable $I_{swp}$ defined by the map. The relationship shown in FIG. 5 is on the assumption that the anode pressure is constant, and the relationship shown in FIG. 6 is on the assumption that the FC temperature is constant.

If it is determined in step S2 that the comparison target value is smaller than the reference value, the closed mode is selected, and the exhaust valve 14 is closed (step S4). Thus, the fuel cell system carries out the anode dead end operation.

On the other hand, if the comparison target value is equal to or greater than the reference value, the routine proceeds from step S2 to step S6. In step S6, it is determined whether to switch from the closed mode to the exhaust mode. In this switching determination, the comparison target value is compared with a value that is greater than the reference value by an offset value α ($I_{swt}*I_{swp}+α$). If the comparison target value is greater than the reference value plus α, the exhaust mode is selected, and the exhaust valve 14 is controlled to open at a predetermined duty ratio (step S8). Thus, the fuel cell system carries out the continuous small amount discharge operation.

If the comparison target value is equal to or greater than the reference value and equal to or smaller than the reference value plus α, the current operation mode is maintained. That is, if the currently selected operation mode is the closed mode, switching to the exhaust mode does not occur until the comparison target value becomes greater than the reference value plus α. On the other hand, if the currently selected operation mode is the exhaust mode, switching to the closed mode does not occur until the comparison target value becomes smaller than the reference value. Thus, frequent switching of the operation mode of the exhaust valve 14 caused by variations of the comparison target value around the reference value can be prevented.

According to the routine described above, the reference value ($I_{swt}*I_{swp}$) is determined from the FC temperature and the anode pressure that relate to the diffusion rate of nitrogen in the anode gas flow channel 42, and the comparison target value {$I^*(P_O/P_A)$} is determined from the current value and the anode pressure that relate to the flow rate of hydrogen in the anode gas flow channel. Then, the reference value and the comparison target value are compared. Based on the comparison, it can be properly determined whether nitrogen can be accumulated at the downstream end of the anode gas flow channel 42 or not. Therefore, a high level of prevention of degradation of the performance of the fuel cell stack and a high level of reduction of the amount of discharged hydrogen can be both achieved by switching between the exhaust mode and the closed mode based on the result of the comparison.

While an embodiment of the present invention has been described above, the present invention is not limited to the embodiment, and various variations can be made without departing from the spirit of the present invention. For example, the variations described below are possible.

In the embodiment described above, the current value of the fuel cell stack 2 is measured. However, the current value does not have to be measured if the loading state of the fuel cell stack 2 can be determined without the current value. When the fuel cell stack 2 operates in a high load region, the consumption of hydrogen and therefore the flow rate of hydrogen in the anode gas flow channel 42 are higher than when the fuel cell stack 2 operates in a low load region. Therefore, the exhaust mode can be selected when the fuel cell stack 2 operates in a predetermined high load region, and the closed mode can be selected when the fuel cell stack 2 operates in a lower load region than the predetermined load region. Since whether nitrogen can be accumulated at the downstream end of the anode gas flow channel 42 in a loading state depends on the diffusion rate of nitrogen in the loading state, the predetermined load region is preferably determined based on the gas temperature or gas pressure in the anode gas flow channel 42.

The invention claimed is:

1. A fuel cell system of an anode dead end system, comprising:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the amount of fuel gas consumed in said anode gas flow channel is discharged to an outside of the system and a closed mode in which communication between said anode gas flow channel and the outside of the system is blocked;

detecting means for detecting a downstream flow of an impurity in said anode gas flow channel based on a physical quantity relating to a flow rate of the fuel gas in said anode gas flow channel and a physical quantity relating to a diffusion rate of the impurity in said anode gas flow channel; and controlling means programmed for controlling the operation of said exhaust mechanism such that said exhaust mode is selected when the magnitude of the downstream flow of the impurity meets a predetermined switching criterion and said closed mode is selected when the magnitude of the downstream flow of the impurity does not meet said switching criterion;

wherein the predetermined switching criterion is met when a reference value calculated from a measurement value of the physical quality of the diffusion rate of the impurity is smaller than a comparison target value calculated from a measurement value of the physical quantity of the flow rate of the fuel gas;

the physical quantity relating to the flow rate of the fuel gas includes a current value of said fuel cell and a gas pressure in said anode gas flow channel; and the physical quantity relating to the diffusion rate of the impurity includes a temperature of said fuel cell or a gas temperature in said anode gas flow channel and a gas pressure in said anode gas flow channel.

2. A fuel cell system of an anode dead end system, comprising:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the amount of fuel gas consumed in said anode gas flow channel is discharged to an outside of the system and a closed mode in which communication between said anode gas flow channel and the outside of the system is blocked;

determining means for determining the loading state of said fuel cell; and controlling means programmed for controlling the operation of said exhaust mechanism such that said exhaust mode is selected when said fuel cell operates in a predetermined high load region and said closed mode is selected when said fuel cell operates in a lower load region than said predetermined high load region; wherein said controlling means sets the predetermined high load region based on a gas temperature or gas pressure in said anode gas flow channel.

3. A fuel cell system of an anode dead end system, comprising:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the amount of fuel gas consumed in said anode gas flow channel is discharged to an outside of the system and a closed mode in which communication between said anode gas flow channel and the outside of the system is blocked;

first measuring means for measuring a physical quantity relating to the flow rate of the fuel gas in said anode gas flow channel;

second measuring means for measuring a physical quantity relating to the diffusion rate of an impurity in said anode gas flow channel; and controlling means programmed for controlling the operation of said exhaust mechanism that performs switching between said exhaust mode and said closed mode based on comparison between a reference value calculated from a measurement value of said second measuring means and a comparison target value calculated from a measurement value of said first measuring means;

wherein the first measuring means measures a current value of said fuel cell and a gas pressure in said anode gas flow channel; and the second measuring means measures a temperature of said fuel cell or a gas temperature in said anode gas flow channel and a gas pressure in said anode gas flow channel.

4. A fuel cell system of an anode dead end system, comprising:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the amount of fuel gas consumed in said anode gas flow channel is discharged to an outside of the system and a closed mode in which communication between said anode gas flow channel and the outside of the system is blocked;

a detecting device for detecting a downstream flow of an impurity in said anode gas flow channel based on a physical quantity relating to a flow rate of the fuel gas in said anode gas flow channel and a physical quantity relating to a diffusion rate of the impurity in said anode gas flow channel; and a controlling device programmed for controlling the operation of said exhaust mechanism such that said exhaust mode is selected when the magnitude of the downstream flow of the impurity meets a predetermined switching criterion and said closed mode is selected when the magnitude of the downstream flow of the impurity does not meet said switching criterion;

wherein the predetermined switching criterion is met when a reference value calculated from a measurement value of the physical quality of the diffusion rate of the impurity is smaller than a comparison target value calculated from a measurement value of the physical quantity of the flow rate of the fuel gas;

the physical quantity relating to the flow rate of the fuel gas includes a current value of said fuel cell and a gas pressure in said anode gas flow channel; and the physical quantity relating to the diffusion rate of the impurity includes a temperature of said fuel cell or a gas temperature in said anode gas flow channel and a gas pressure in said anode gas flow channel.

5. A fuel cell system of an anode dead end system, comprising:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the amount of fuel gas consumed in said anode gas flow channel is discharged to an outside of the system and a closed mode in which communication between said anode gas flow channel and the outside of the system is blocked;

a determining device for determining the loading state of said fuel cell; and a controlling device programmed for controlling the operation of said exhaust mechanism such that said exhaust mode is selected when said fuel cell operates in a predetermined high load region and said closed mode is selected when said fuel cell operates in a lower load region than said predetermined high load region; wherein said controlling means is programmed to set the predetermined high load region based on a gas temperature or gas pressure in said anode gas flow channel.

6. A fuel cell system of an anode dead end system, comprising:

a fuel cell that generates an electric power using a fuel gas supplied to an anode thereof and air supplied to a cathode thereof;

an exhaust mechanism that is connected to a downstream end of an anode gas flow channel and is capable of selecting an operation mode from among at least an exhaust mode in which a substantially smaller amount of gas than the amount of fuel gas consumed in said anode gas flow channel is discharged to an outside of the system and a closed mode in which communication between said anode gas flow channel and the outside of the system is blocked;

a first measuring device for measuring a physical quantity relating to the flow rate of the fuel gas in said anode gas flow channel;

a second measuring device for measuring a physical quantity relating to the diffusion rate of an impurity in said anode gas flow channel; and a controlling device programmed for controlling the operation of said exhaust mechanism that performs switching between said exhaust mode and said closed mode based on comparison between a reference value calculated from a measurement value of said second measuring device and a comparison target value calculated from a measurement value of said first measuring device;

wherein the first measuring means measures a current value of said fuel cell and a gas pressure in said anode gas flow channel; and the second measuring means measures a temperature of said fuel cell or a gas temperature in said anode gas flow channel and a gas pressure in said anode gas flow channel.

* * * * *